United States Patent [19]

Singh

[11] 4,365,681

[45] Dec. 28, 1982

[54] BATTERY SUPPORT STRUCTURE

[75] Inventor: Harmahendar Singh, Sterling Heights, Mich.

[73] Assignee: General Motors Corporation, Detroit, Mich.

[21] Appl. No.: 218,936

[22] Filed: Dec. 22, 1980

[51] Int. Cl.³ .............................................. B60K 1/04
[52] U.S. Cl. .................................... 180/68.5; 105/51; 429/100
[58] Field of Search ...................... 180/68.5, 65 R, 60, 180/65 A, 65 E; 105/51; 429/100, 99, 98, 97, 96; 440/6; 104/34

[56] References Cited

U.S. PATENT DOCUMENTS

| | | | |
|---|---|---|---|
| 1,068,250 | 7/1913 | Koenig | 180/68.5 X |
| 1,138,122 | 5/1915 | Lambert et al. | 180/68.5 |
| 1,173,616 | 2/1916 | Stone | 180/68.5 |
| 1,551,594 | 9/1925 | Walter | 180/65 R |
| 1,678,033 | 7/1928 | Brumbaugh | 180/68.5 |
| 2,705,254 | 3/1955 | Middleton | 180/68.5 X |
| 2,709,494 | 5/1955 | Luce | 180/68.5 |
| 3,847,242 | 11/1974 | Kappei | 180/68.5 |
| 3,930,552 | 1/1976 | Kunkle et al. | 180/68.5 |
| 4,135,593 | 1/1979 | Fowkes | 180/68.5 X |

Primary Examiner—David M. Mitchell
Assistant Examiner—Milton L. Smith
Attorney, Agent, or Firm—Patrick M. Griffin

[57] ABSTRACT

A structure for supporting a plurality of rows of batteries includes a frame having side rails and cross members releasably supported beneath the vehicle. Aligned pairs of I-type beams are cantilevered from the side rails of the frame. The lower flanges of parallel aligned pairs of beams underlie and support a respective edge of a row of batteries placed therebetween with the top flanges of the beams located below the upper edges of the batteries. The top flanges of the beams are narrower than would be necessary for an equivalent simple beam, thus maximizing the number of batteries containable in the available space.

3 Claims, 5 Drawing Figures

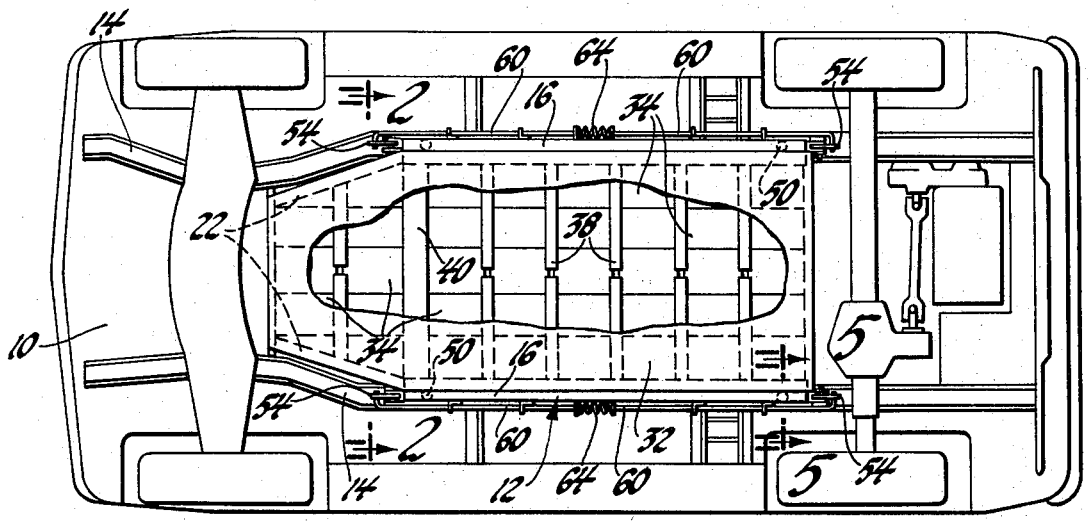
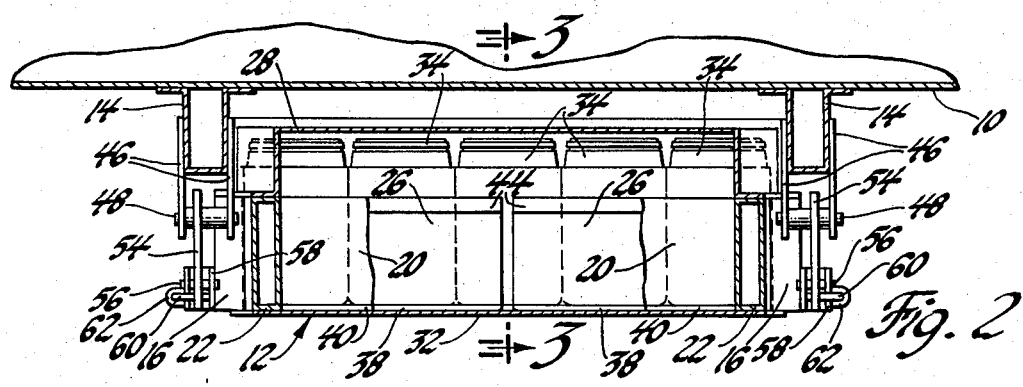
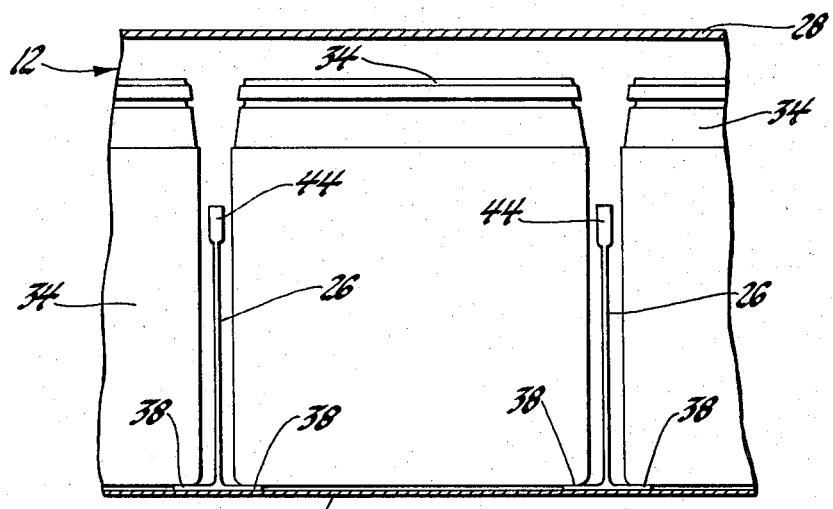

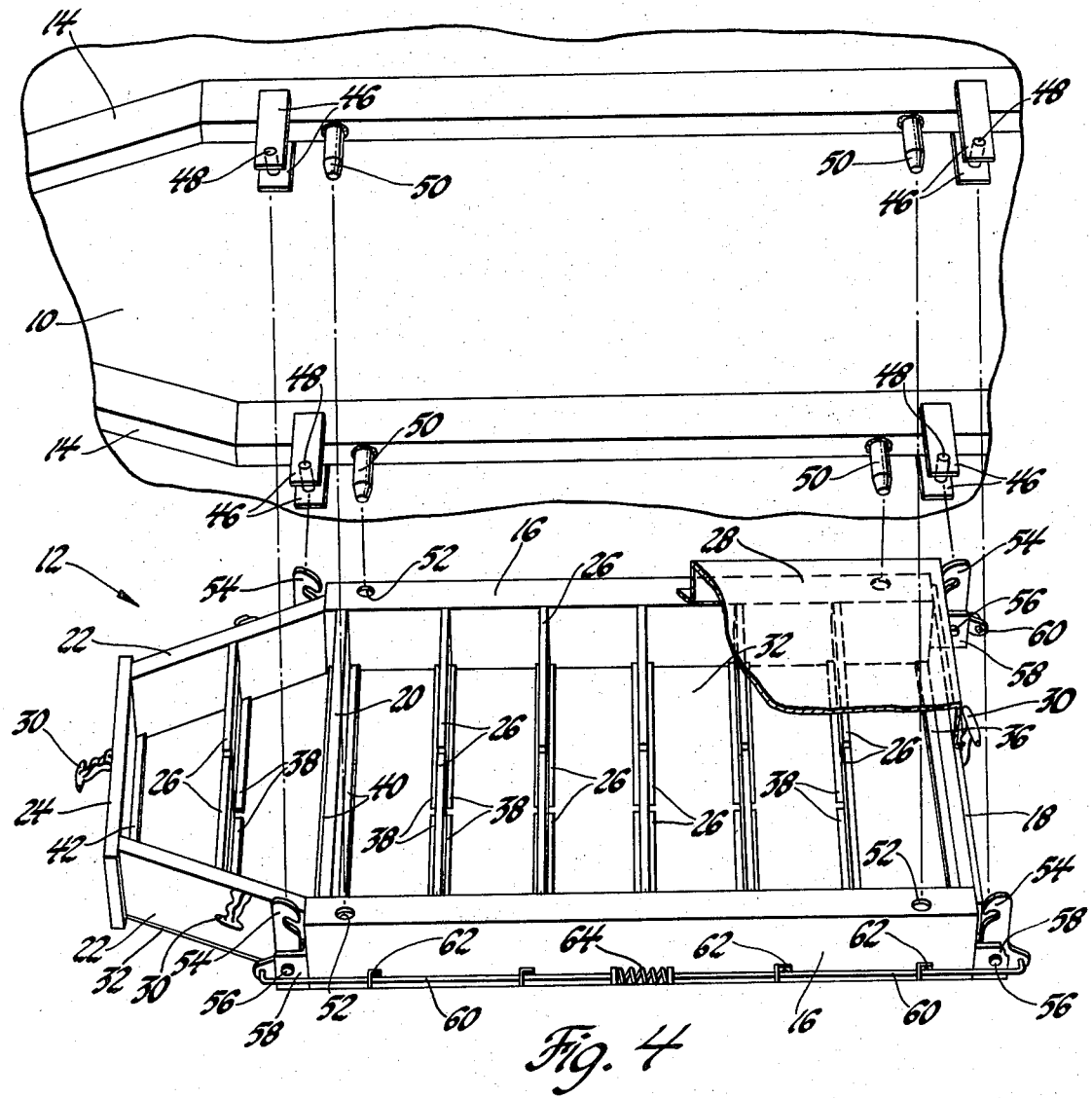
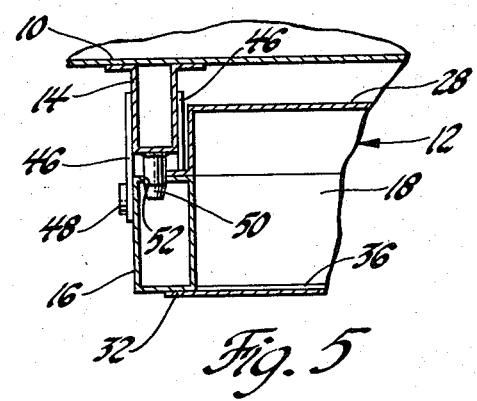

BATTERY SUPPORT STRUCTURE

BACKGROUND OF THE INVENTION

This invention relates to a battery support and specifically to a battery support which supports a maximum number of batteries in the space available beneath a vehicle.

DESCRIPTION OF THE PRIOR ART

Structures for supporting and containing batteries in electric vehicles, both those in the first electrical vehicles manufactured in the early 1900s and those currently being produced, have utilized boxes, trays and simple beam structures. The emphasis has been on ease of access or removability of batteries without particular attention to containing a maximum number of batteries in the available space. For example, Koenig U.S. Pat. No. 1,068,250 shows a support structure comprised of simple parallel beams with an auxiliary tray hanging on the side to facilitate the removal of batteries. Kappei U.S. Pat. No. 3,847,242 shows a series of batteries supported in a simple box mounted on guide rails to facilitate removal. Neither is directed to the support of a maximum number of batteries in a limited space by a support structure of minimum weight.

BRIEF SUMMARY OF THE INVENTION

The battery support structure of this invention is hung beneath the vehicle frame and includes a series of parallel pairs of I beams cantilevered from the side rails of the support structure. The lower flange of each beam serves to underlie and support an edge of a battery in cooperation with the corresponding lower flange of its parallel beam. The top flanges of each beam are of a smaller dimension and, together with a connecting web of each beam, lie within the space occupied by the batteries. Thus, a support beam is used in which the centroid lies within the space occupied by the batteries allowing the batteries to be supported with minimal spacing therebetween. This allows a maximum number of batteries to be stored and utilizes the materials in a support structure most effectively. In addition, the center of gravity of the vehicle is kept low and only space which is otherwise unused in the vehicle is occupied.

BRIEF DESCRIPTION OF THE DRAWINGS

The operation and construction of the above invention may be understood from the following drawings and description in which:

FIG. 1 is a partially broken away view of the underside of a vehicle showing the battery support structure in place with batteries supported thereon;

FIG. 2 is an enlarged sectional view taken along the line 2—2 of FIG. 1;

FIG. 3 is an enlarged sectional view taken along the line of 3—3 of FIG. 2;

FIG. 4 is an exploded partial perspective view showing the battery support structure removed from and beneath the frame of the vehicle; and FIG. 5 is an enlarged sectional view taken along the line 5—5 of FIG. 1.

DESCRIPTION OF THE PREFERRED EMBODIMENT

Traction batteries necessarily occupy a great deal of volume and represent a major part of the weight of an electric vehicle. It is therefore desirable that they be stored in a space which is otherwise unused, leaving the maximum amount of cargo and passenger space remaining. Also, it is desirable that they be stored in such a way as to keep the center of gravity of the vehicle low. An ideal space for such storage is beneath the vehicle floor, but because of limited ground clearance, any such support structure must be carefully designed to use the available space for maximum effectiveness.

Referring to FIG. 1, the underside of a vehicle designated generally at 10 is shown with the subject battery support structure generally designated 12 located in the space available beneath the vehicle, specifically between the two longitudinally extending frame side rails 14.

Referring to FIG. 4, the general construction of the support structure 12 may be seen. A pair of main side rails 16 of box cross-section are joined by a rear cross member 18 and an intermediate cross member 20. A pair of secondary side rails 22, also of box cross-section, are cantilevered from the ends of the main side rails 16 and are joined by a flanged front cross member 24. The general shape of the support structure 12 is designed to conform to the shape of frame side rails 14 as can be seen in FIG. 1. Five pairs of cantilevered I beams 26 run parallel to one another between the main side rails 16 and another pair of cantilevered I beams 26 runs between the secondary side rails 22. The cantilevered I beams 26 of each pair are opposed to each other. These beams run approximately to the center of support structure 12 and do not completely bridge the rails 16 as a simple beam would. The reason for this will be described further below. In the embodiment disclosed, the material used throughout the structure is welded aluminum. A non-structural flanged top cover 28 seats on the rails 16 and 22, rear cross member 18 and front cross member 24 and is attached thereto by a number of conventional snap-fit hooks 30 or other suitable means. A non-structural bottom cover 32 encloses the bottom of the support structure 12 and is attached to the rails and cross members by welding or other conventional means. Top and bottom covers 28 and 32 are designed to keep the enclosure of the support structure free of dust and water and may be made of any suitable material.

The support of the batteries 34 within the structure may be understood by referring to FIGS. 1, 3 and 4. Referring to FIG. 4, rear cross member 18 includes a lower flange 36 which is level with and generally of the same width as the bottom flanges 38 on the corresponding parallel pair of I beams 26. Intermediate cross member 20 has a pair of lower flanges 40 which are level with and generally of the same width as the bottom flanges 38 of the corresponding pairs of I beams 26 on each side of it. In addition, the front cross member 24 has a lower flange 42 level with and of the same width as the bottom flanges 38 of the frontmost pair of I beams 26. Rows of batteries 34 sit between the beams and rest on the parallel pairs of flanges. The clearance between the batteries 34, the beams 26 and the cross members 18, 20 and 24 is sufficient to allow for any expansion which may occur when certain types of batteries are charged. This clearance may be seen in FIG. 3. Referring to FIGS. 1 and 4, it will be seen that the number of batteries containable between the intermediate cross member 20 and front cross member 24 is fewer than can be contained in the rest of the structure, but, as already mentioned, the shape of the front of the support structure 12 follows the shape of the frame side rails.

The advantage of the support structure may be understood by referring to FIGS. 3 and 4. The top flanges of those beams which run completely across the main side rails 16, such as intermediate cross member 20, are all wider than the top flanges 44 of the I beams 26. This is because a simple beam has the top member in compression rather than in tension and must be relatively wide in order to resist buckling. It is more design effective to rest the batteries on the lower flanges rather than on the top flanges of the supporting beams as this will give a reasonably good ground clearance under the support structure and best use the limited space available beneath the vehicle. Designing the top flanges of the support beams as narrow as possible can potentially allow an entire extra row of batteries to be stored. The side rails 16 may be made deep enough to resist the increased torsion induced thereon by the cantilevered beams 26 with no undue design constraint.

Referring now to FIGS. 2, 4 and 5, the support structure 12 is supported beneath the frame side rails 14 at four support points. Spaced pairs of hanger brackets 46 are welded or otherwise attached to the inboard and outboard sides of each frame side rail 14 and each pair of brackets is interconnected by a pin 48. Proximate to each pair of hanger brackets 46 is a tapered locating stud 50 welded to the frame rail and received in a cooperating hole 52 in a main side rail 16. At each end of each side rail 16 a hook 54 is pivoted on a pin 56 that extends between the legs of a U-Bracket 58, FIG. 4. The hooks 54 at the ends of each side rail 16 are each pivotally attached to one end of a respective connecting rod 60 which passes through a respective guide 62 attached to the outboard side of the side rail. The ends of rods 60 are interconnected by a compression spring 64. Spring 64 continually biases the connecting rods 60 apart from each other longitudinally of rail 16 to in turn to continually bias hooks 54 toward each other, with each hook being located by the engagement thereof with the base of a respective U-Bracket 58.

The batteries 34 are loaded on the support structure 12 prior to attachment of the support structure to the vehicle 10. In order to attach the support structure to the vehicle, the vehicle is lifted on a suitable hoist above the support structure 12 as shown in FIG. 4. The support structure 12 is then lifted and the locating studs 50 inserted into the holes 52 and the upper sides of the rails 16 seated against the lower sides of the rails 14. As the rails are seated against each other, the upper ends of the hooks 54 engage the pins 48 to bias the hooks oppositely of each other against the action of the springs 64 until the pins 48 are received within the slots of the hooks. The studs 50 control horizontal movement of the battery support structure relative to the vehicle 10 while the engagement of the hooks 54 with the pins 48 provide the vertical support and attachment of the battery support structure on the vehicle 10. In order to remove the support structure 12 from beneath the vehicle, the vehicle is raised, the battery support structure 12 is supported, and then the hooks 54 are manually disengaged from the pins 48 so that the battery support structure can thereafter be lowered to the ground.

In addition to supporting a maximum number of batteries in the space available, the support structure effectively uses space which is otherwise unoccupied, leaving a maximum amount of passenger and cargo space available.

The embodiments of the invention in which an exclusive property or privilege is claimed are defined as follows:

1. A structure for supporting a plurality of batteries in rows beneath a vehicle, comprising,
    a structural frame located beneath the vehicle and having a pair of side rails running longitudinally of the vehicle,
    a plurality of pairs of aligned I-type beams running generally transversely of the side rails, each beam of each aligned pair being cantilevered from a respective side rail and running approximately to the center of support structure,
    each cantilevered beam having a lower and an upper flange, the upper flanges of each parallel pair of cantilevered beams being spaced apart a distance slightly greater than the width of the row of batteries supported therebetween with the lower flanges thereof being spaced apart a distance less than such width so as to underlie and support the lower edges of a row of batteries supported thereon, the upper flanges of the cantilevered beams being located between adjacent rows of batteries and means releasably mounting the frame to the vehicle.

2. A structure for supporting a plurality of batteries in rows beneath a vehicle, comprising,
    a structural frame located beneath the vehicle and having a pair of longitudinal side rails,
    a plurality of generally parallel pairs of aligned I-type beams, each pair extending generally transversely of the side rails, means cantilevering each aligned pair of I-type beams from a respective side rail, each cantilevered beam having a lower and an upper flange, the upper flange being located beneath the tops of the rows of batteries and having a width narrow enough to allow for natural expansion and contraction of the batteries, the lower flanges of each parallel pair of cantilevered beams being wide enough to underlie and support the lower edges of a row of batteries, and means releasably mounting the frame to the vehicle.

3. In combination with a vehicle, a structure for supporting a plurality of batteries in rows beneath the vehicle, comprising,
    a structural frame adapted to be attached beneath the vehicle and having a pair of longitudinal side rails,
    a plurality of generally parallel pairs of aligned I-type beams running generally transversely to the side rails, each beam having a lower and an upper flange,
    means cantilevering each beam of each aligned pair from a respective side rail,
    the lower flanges of each parallel pair of beams being wide enough to underlie and support the lower edges of a row of batteries supported between the beams, and the upper flanges of such pair being located below the top edges of a row of supported batteries and spaced apart a distance slightly greater than the width of a row of batteries,
    means locating the structural frame beneath the vehicle, and
    means releasably mounting the structural frame to the vehicle.

* * * * *